United States Patent Office 3,288,405
Patented Nov. 29, 1966

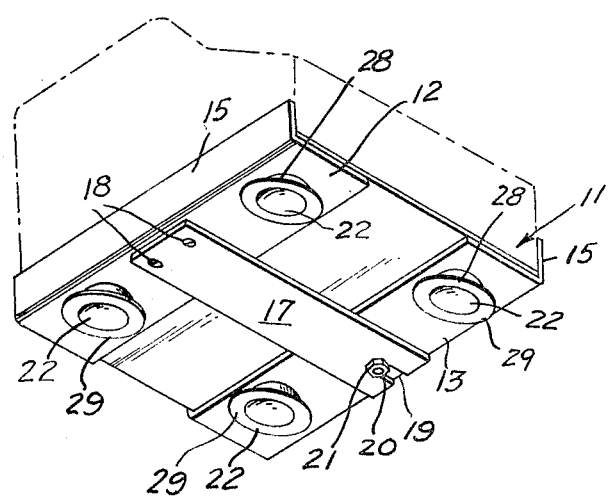
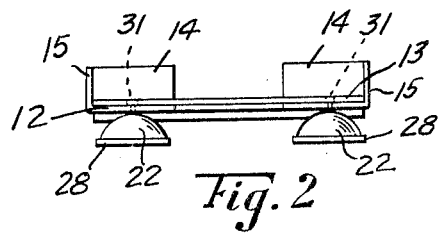
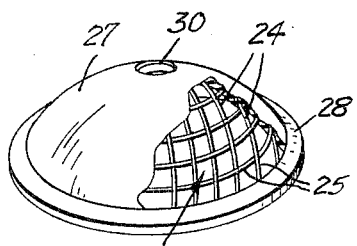
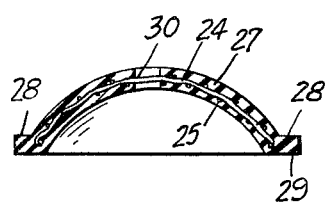
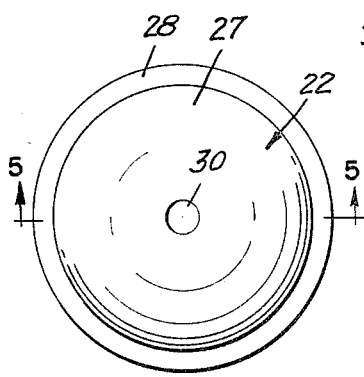

3,288,405
VIBRATION ISOLATOR
Kenneth W. Johnson, 208 Dumbarton Oaks,
Dayton, Ohio
Filed Oct. 8, 1964, Ser. No. 402,587
4 Claims. (Cl. 248—24)

The present invention relates to a vibration isolating and friction gripping device for business machines, test equipment, electronic equipment, industrial machines and the like, and constitutes a continuation-in-part of my copending application Serial No. 177,037 filed March 2, 1962 for a Vibration Isolator and Gripping Device, now abandoned.

A primary object of the invention is the provision of novel dome-shaped resilient elements which when properly attached to a particular device or machine provide correct spring strengths or rates at a loading point whereby the vibration of the particular machine or device is either absorbed by or dissipated in the resilient element of this invention, thus reducing the transmission of vibration. In addition, the resilient elements of this invention, when subjected to varying load conditions, provide tenacious friction engagement with a supporting surface which restricts creeping or sliding of the supported equipment.

A further object of the invention is the provision of a unit comprising a pair of mounting trays or a frame of adjustable width in accordance with the size of the base of the particular machine or device to be supported, as, for example, a typewriter, a telephone, or the like, by a plurality of dome-shaped vibration isolators in accordance with the instant invention fixed at their apices to the bottom of the frame.

A further object of the invention is to provide a device of the character set forth which is fully self-contained.

Another object of the invention is to provide a device of the character described which will fit machines of different sizes, weights and vibration factors, through width adjustability and by the use of differently rated springs.

A further object of this invention is to provide devices of the character described which may be fitted directly to certain machines and equipment to provide a synergistic vibration-absorbent frictionally-engaging action whereby such machines and equipment cause the devices under load to expand and thus exert increasing frictional engagement as the spring component of the devices spreads under increased loading.

Other objects of the invention are: to reduce vibration transmitted to support structures; to reduce noise; to match the spring strengths to the loadings at the support points (conventional rubber and felt pads have constant initial spring ratings over their entire areas); to add to the appearance of the machines and devices of the type set forth above and the office; to provide "floating" mounting for such machines and devices; and to provide long life (as compared with compressible rubber, conventional spring or felt pads).

Other objects of the invention will become apparent from a reading of the following specification taken in conjunction with the drawings, in which:

FIGURE 1 is a perspective view of the under surface of a preferred embodiment of the invention, shown in conjunction with a frame type support;

FIGURE 2 is a front elevational view of the support of FIGURE 1;

FIGURE 3 is a perspective view partially broken away of one of the dome-shaped elements of the instant invention;

FIGURE 4 is an enlarged top plan view of one resilient element of FIGURE 3; and, FIGURE 5 is a sectional view taken substantially along the line 5—5 of FIGURE 4, as viewed in the direction indicated by the arrows.

Similar reference characters refer to similar parts throughout the several views of the drawings.

With reference to FIGURE 1, this invention will be described as a component of a width adjustable frame type support generally designated by numeral 11. Support 11 comprises a pair of angle bar sections 12 and 13 and the rear ends of these are bent upwardly to form retaining flanges 14 of the same height as side flanges 15.

Support 11 is made width adjustable to hold machines, such as, for example, typewriters, of different sizes, by a rigid metal strap 17 riveted at 18 to the bottom surface of angle bar 12 medially thereof and extending at right angles therefrom to underlie the central portion of the other angle bar 13. Strap 17 has a central longitudinal slot 19 in its free end for width adjustably receiving therein the shank of a screw 20. Screw 20 cooperates with a nut 21 to clamp the strap 17 rigidly to the bottom surface of angle bar 15 to hold the parts 12 and 13 in desired adjusted parallel spacing.

Each of the angle bars 12 and 13 is provided with front and rear resilient feet 22 constructed in accordance with the instant invention. It is preferred, but not necessary, that all of the feet 22 should be of the same size, shape and appearance. However, for supporting machines in which the loading on the several feet would vary considerably, it is desirable to employ the feet of this invention in which the dome-shaped portions are of selected strengths to compensate for the variation in the loading thereon.

Each dome-shaped member consists of a plurality of concaved resilient radially extending spring wires 24, as for example No. 18 gauge steel wire, interwoven with concentric circular spring wires 25 of successively increasing diameter to form a compressible dome-shaped spring member generally indicated at 26, wherein each individual wire 24 constitutes a spring in itself. Member 26 is completely encased in a rubber covering 27, so that no bare metal is exposed. An integral annular flange 28 having a flat bottom surface 29 surrounds the bottom of the dome-shaped member and provides a frictional gripping surface, the grip of which is increased in accordance with an increase of pressure on the top of its associated dome-shaped member. A central opening 30 at the apex of the member extending through covering 27 and spring member 26 accommodates a rivet 31 for securing the device to the associated frame member 12 or 13.

As will be apparent, the vibration isolators of this invention have unlimited adaptability with respect to all types of machines and equipment, which require vibration-absorbing frictionally engaging action for most effective use. Moreover, such machines and equipment which utilize the vibration isolators of this invention, cause such devices under loading conditions to exert a tenacious frictional engagement by reason of the fact that the spring component of the device spreads under increased loading conditions.

While the foregoing presents a preferred embodiment of the present invention, it is obvious that other modifications and/or equivalents may be employed without departing from the scope of the invention, which is defined in the appended claims.

What is claimed is:

1. A vibration isolating support for business machines or the like comprising: a horizontally disposed supporting base structure formed of a pair of coplanar parallel elongated plates adapted to underlie the lateral base portions of said machine, a transverse member centrally affixed to one of said plates and adjustably connected to the other plate for holding said plates in width adjusted relative positions, said transverse member being a rigid strap having a longitudinally disposed slot in its free end, a screw fixed to said other plate and positioned to extend downwardly through said slot, and a nut on said screw for adjustably clamping said transverse member to said other plate, each of said plates having upstanding machine positioning and retaining flanges along their lateral and rear edges, an upwardly convex spring element fixed at its apex to the under surface of each end portion of each of said plates, and a cup-shaped pad of resilient material covering each of said spring elements.

2. The structure of claim 1 wherein said upwardly convex spring element comprises a dome-shaped structure of interwoven resilient wire including radially extending concaved individual spring wires.

3. The structure of claim 2 wherein said pad comprises a resilient casing completely encasing said convex spring element.

4. The structure of claim 3 wherein said casing includes an integral annular flange surrounding the bottom of said casing and having a flat friction gripping surface.

References Cited by the Examiner

UNITED STATES PATENTS

| | | | |
|---|---|---|---|
| 2,607,590 | 8/1952 | Wheaton | 248—188.8 X |
| 2,670,914 | 3/1954 | Jones | 284—24 |
| 2,778,629 | 1/1957 | Johnson | 267—1 |
| 3,120,381 | 2/1964 | Sweeney et al. | 248—358 X |

CLAUDE A. LE ROY, *Primary Examiner.*

JOHN PETO, *Examiner.*